United States Patent Office 3,180,883
Patented Apr. 27, 1965

3,180,883
4,4'-DIISOCYANATO-3,5-DI-LOWER ALKYL-DIPHENYLMETHANE
Leslie C. Case, Lafayette, Ind.
(14 Lockeland Road, Winchester, Mass.)
No Drawing. Filed July 18, 1960, Ser. No. 43,326
1 Claim. (Cl. 260—453)

This invention relates to organic diisocyanates. More particularly, it is concerned with diisocyanates in which one of the isocyanate groups is hindered or blocked to render it relatively less reactive than the other isocyanate group, especially with compounds having active hydrogen-containing functional groups.

This application is a continuation-in-part of my co-pending application, Serial No. 845,073, filed October 8, 1959, now abandoned.

Recently diisocyanates have become of extreme commercial importance. Due to their chemical nature, however, they are very reactive generally with groups containing an active hydrogen such as—OH, —COOH, —NH$_2$, etc. In carrying out reactions with the diisocyanates, extreme care must be exercised to prevent undesirable reactions by carefully controlling the various operations and procedures such as order of addition, temperature, presence of moisture and the like in order to avoid undesirable side reactions.

Heretofore, attempts have been made to reduce the activity of the diisocyanates by various means. One such suggested method involves reacting the isocyanate group with a phenol or a compound containing methylene hydrogen such as a malonic ester to form adducts which regenerate the —NCO group on heating to about 150–180° C. Among the compounds which may be used to form mono adducts of diisocyanates are aceto-acetic ester; diethyl malonate; mercaptans such as 2-mercapto benzothiazole; lactams, imides such as succinimide, phthalimide and the like; tertiary amyl alcohol; dimethyl phenyl carbinol; and secondary amines such as diphenylamine. These adducts regenerate —NCO groups on heating to 100–150° C.

It is also well known that dimeric aromatic isocyanates such as the dimer of phenyl isocyanate regenerate the original isocyanate on heating to 150–180° C.

Both the adduct and dimer methods of forming blocked isocyanate groups require heating to a high temperature to free the isocyanate group. Unfortunately, this is frequently impossible due to various reasons such as the shape and dimensions of the object containing these materials which preclude placing the object in an oven, or the adverse effects of high temperatures on the objects. These requirements for the liberation of the —NCO group obviously place restrictions and inconvenience on the use of adducts and dimers of isocyanates.

Another method of blocking isocyanate groups so as to render them relatively unreactive at room temperature is the placement of the isocyanate group on a tertiary alkyl radical. (O. Stallmann, U.S. 2,729,666, U.S. 2,723,265.) Such tertiary alkyl isocyanates are relatively unreactive with most compounds having active hydrogen-containing functional groups below temperatures of about 85° C. However, such tertiary alkyl isocyanates are relatively unreactive with many active hydrogen-containing functional groups even at temperatures exceeding 100° C. Certain compounds containing urea linkages will not react with tertiary alkyl isocyanates to form biurets even at 120° C., for example.

It is therefore an object of the present invention to reduce the reactivity with hydroxyl groups of one of the isocyanate groups in organic diisocyanates, especially at or near room temperature, while retaining the reactivity with hydroxyl groups of this group at elevated temperatures. Another object is the provision of diisocyanates having one relatively active isocyanate group and one relatively inactive isocyanate group. Other objects will be apparent as the description of the invention proceeds.

According to the present invention there are provided novel organic diisocyanates in which each of the two isocyanate groups is present as a substituent on an aryl, particularly hydrocarbon aryl, group and one of said isocyanate groups is positioned between essentially nonreactive nuclear substituents located on the aryl group at each of the positions ortho to the isocyanate group and the aryl group containing the other isocyanate group has no nuclear substituents in either position ortho to said second isocyanate group. Thus, both of the isocyanate groups can be on the same aryl group or each isocyanate group can be on a separate aryl group.

The most useful aryl group is phenyl although the naphthyl group and others can also be employed satisfactorily.

The nonreactive nuclear substituents located in both ortho positions to one of the isocyanate groups serve to block or hinder this group and render it substantially less reactive with hydroxyl groups than the other isocyanate group which contains no substituents in either position ortho to it. This difference in reactivity is the basis of many uses for the products in plastics and other polymeric materials.

Typical of the nuclear substituents which can be positioned in both of the positions ortho to one of the isocyanate groups are halo groups and particularly the chloro, bromo and iodo groups, lower alkyl groups and particularly those of 1 to 8 carbons such as methyl, ethyl, propyl, isopropyl and butyl, halo substituted lower alkyl groups such as trifluoromethyl, the nitro group, lower alkoxy groups and particularly those of 1 to 8 carbons such as methoxy, ethoxy, propoxy and butoxy, aryl groups and particularly phenyl and biphenyl, aralkyl and particularly phenyl-lower alkyl groups such as benzyl and phenylethyl, aryloxy groups and particularly phenoxy, and aralkoxy groups and particularly phenyl-lower alkoxy groups such as phenylmethoxy, phenylethoxy and phenylpropoxy. The substituents in both ortho positions may be identical or different.

Some of the compounds within the above description and encompassed by this invention have the formulae:

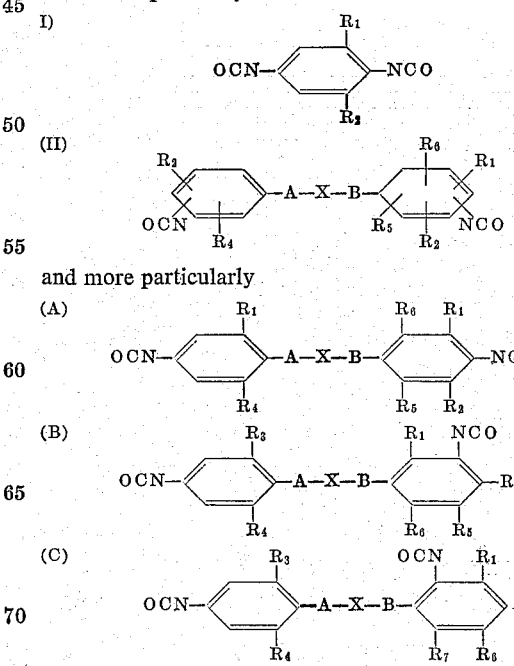

(D) 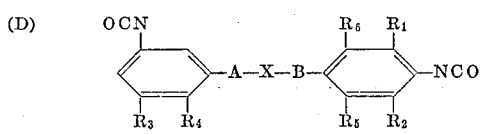

wherein $R_1$ represents a halo group and particularly the chloro, bromo and iodo groups, lower alkyl groups and particularly those of 1 to 8 carbons such as methyl, ethyl, propyl, isopropyl and butyl, halo substituted lower alkyl groups such as trifluoromethyl, the nitro group, lower alkoxy groups and particularly those of 1 to 8 carbons such as methoxy, ethoxy, propoxy and butoxy, aryl groups and particularly phenyl and biphenyl, aryloxy groups and particularly phenylmethoxy, phenylethoxy and phenylpropoxy, $R_2$, $R_3$, $R_4$, $R_5$, $R_6$ and $R_7$ have the same meaning as $R_1$ but in addition can be hydrogen, the phenyl group containing $R_1$ and $R_2$ always having substituents other than hydrogen in the positions ortho to the isocyanate group, $R_3$ and $R_4$ are positioned in the meta and/or para positions from the isocyanate group so that both positions ortho thereto are unsubstituted, X is a chemical bond, a lower straight or branched alkylene group as of 1 to 8 carbons and particularly methylene, ethylene or propylene, oxygen, sulfur, keto, sulfone and the carboxylic acid ester group $$(-\overset{O}{\underset{\|}{C}}-O-)$$

and A and B are chemical bonds or alkylenes and particularly lower alkylenes of 1 to 8 carbons such as methylene, ethylene or propylene.

It is to be noted that in all of these diisocyanates, one isocyanate group is located on an aryl radical with both ortho-positions substituted only by hydrogen. The other isocyanate group is located on an aryl radical with both ortho-positions substituted with radicals other than hydrogen. This is the essential feature of this invention.

The importance of the unsymmetrical diisocyanates of this invention lies entirely in the difference of the reactivities —of the two isocyanate groups on the molecule. It is instructive to consider a specific example. If two moles of a symmetrical diisocyanate (one in which both isocyanate groups are equally reactive) are condensed with one mol of glycol, a random distribution of product results. The product can be represented schematically by the following table:

| Molecule | Mole Fraction |
| --- | --- |
| I | 0.50 |
| I-G-I | 0.25 |
| I-G-I-G-I | 0.125 |
| I-G-I-G-I-G-I | 0.0625 |
| I-G-I-G-I-G-I-G-I | 0.03125 | where I=diisocyanate residue, G=glycol residue.

whereas, if one isocyanate group of the diisocyanate molecule is far more reactive than the other, then the product is essentially completely I-G-I from the same 2-to-1 mole ratio. In this latter case, the less reactive isocyanate groups are the end groups of the product molecule.

Not only does the product made from the unsymmetrical diisocyanate exhibit much greater homogeneity, it also has a substantially lower weight-average molecular weight. The latter, more homogeneous, polymer has a weight-average molecular weight of $2W_x+W_y$, whereas the former, less homogeneous, prepolymer can be calculated to have a weight-average molecular weight of $$(6W_x^2+8W_xW_y+7W_y^2)/(2W_x+W_y)$$

where $W_x$ is the molecular weight of the diisocyanate, and $W_y$ is the weight of the diol. The ratio of these two molecular weights is about 3 to 7. This ratio would be represented by a several-fold difference in the viscosities of the prepolymers.

An even more striking comparison can be made by considering the reaction of three mols of diisocyanate with one mol of a polymeric triol. The highly unsymmetrical diisocyanate would give a pure product which consists of the adduct of the triol with three diisocyanates, whereas the symmetrical diisocyanate would give a very broad mixture, including some material of gel character. Thus, the viscosity disparity becomes considerably more pronounced as the functionality of the polyol increases.

In actual fact, the difference in reactivities between the two isocyanate groups on a given molecule should not be too large. Even though it is desirable to have a very large difference in these reactivities from the point of view already noted, a very large difference necessarily means that the less reactive isocyanate is quite unreactive. Thus, the less reactive isocyanate group may not react sufficiently rapidly.

It is convenient to define the difference in reactivities between two isocyanate groups on a molecule by taking the ratio of the apparent first order rate constants with excess 2-ethyl hexanol at 20–25° C., Ind. Eng. Chem. 48, 794 (1956). A ten-fold excess of alcohol is used, and the rate constants are measured at about 10–20% ($K_1$), and 70–90% ($K_2$) reaction of the diisocyanate. Results for a number of diisocyanates are given below.

ISOCYANATE REACTIVITY RATIOS

| Isocyanate | Ratio of Reaction Constants $K_1/K_2$ |
| --- | --- |
| OCN—⟨⟩—NCO | 3–4 |
| OCN—⟨⟩(NCO) | 2–3 |
| OCN—⟨⟩—CH₂—⟨⟩—NCO | 2 |
| OCN—⟨CH₃⟩—CH₂—⟨CH₃⟩—NCO | 1 |
| OCN—⟨CH₃⟩—⟨CH₃⟩—NCO | 2 |
| OCN—⟨CH₃/CH₃⟩—⟨CH₃/CH₃⟩—NCO | 1–2 |
| OCN—⟨CH₃O⟩—⟨OCH₃⟩—NCO | 1 |
| OCN—⟨⟩—Cl (NCO) | 3 |
| ⟨NCO⟩—CH₃ (NCO) | 4 |
| OCN—⟨⟩—CH₃ (NCO) | 9 |

| Isocyanate | Ratio of Reaction Constants $K_1/K_2$ |
|---|---|
| 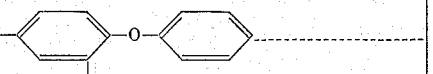 | 7–9 |
| 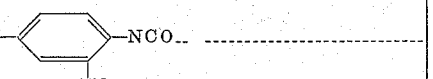 | 8 |
| 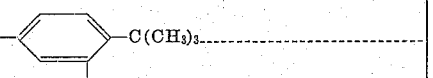 | 9 |
|  | 24–31 |
| 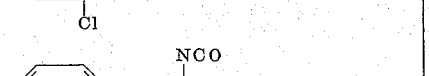 | 7 |
| 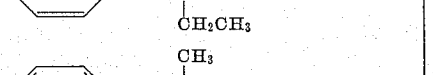 | 150 |

As can be seen from the table, the commonly available diisocyanates all have a value of $K_1/K_2$ less than 10. A diisocyanate with a value of 10 undergoes reactions to yield products which are more homogeneous in composition than those from symmetrical diisocyanates ($K_1/K_2$ about 1–3), but are far less uniform than those with a value of 20–100. On the other hand, the diisocyanates with a ratio of more than 100 are quite sluggish in the reactions of the less reactive group.

Although processes of producing the novel compounds of this invention are generally within the skill of the art, processes considered novel and inventive are provided for the production of compounds of particular economic significance. Thus, novel processes are provided for producing the compounds of the formulae

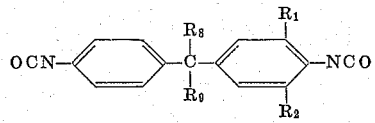

and

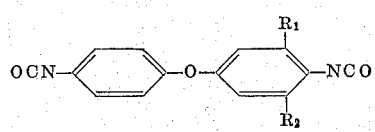

or

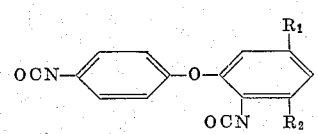

wherein $R_8$ and $R_9$ are hydrogen, lower alkyl groups and particularly of 1 to 5 carbons, aryl groups and particularly phenyl, and aralkyl groups such as benzyl and phenylethyl, and $R_1$ and $R_2$ have the significance assigned above.

The 3,5-dialkyl-4,4'-diisocyanato diphenylmethane type compounds can advisably be produced by coupling aniline and a 2,6-dialkyl aniline with an aldehyde or ketone to form an intermediate 3,5-dialkyl-4,4'-diaminodiphenylmethane which upon phosgenation yields the 3,5-dialkyl-4,4'-diisocyanato diphenylmethane. This process can be represented as follows:

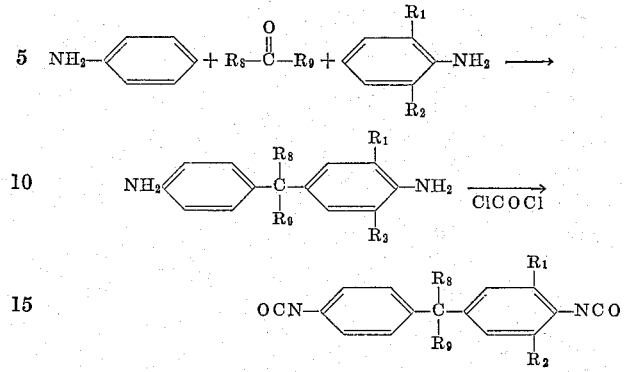

wherein $R_1$, $R_2$, $R_8$ and $R_9$ have the significance assigned above.

In the first step of the process aldehyde such as formaldehyde, acetaldehyde, propionaldehyde and butyraldehyde, and ketones such as acetone, methylethylketone, diethylketone, dipropylketone, benzophenone, methyl benzyl ketone and methyl phenyl ketone, can be used.

The first step of the process is readily effected by contacting the reactants in water or a lower alcohol in the presence of an acid such as hydrochloric acid at from 0° C. to 150° C. The resulting coupled product is separated by conventional means. The resulting diamine is subsequently converted to the diisocyanate by phosgenation.

The 4,4'-diisocyanato diphenylethers are produced by first coupling p-nitrohalobenzene and an alkali metal salt of 3,5-dialkyl phenol at an elevated temperature such as 100–250° C., advisably in the presence of a catalyst such as active copper powder. A small excess of alkali salt is convenient, but not necesary. In this way 3,5-dialkyl-4'-nitrodiphenylether is obtained. This product is then nitrated as with nitric acid or a mixture of nitric acid-acetic anhydride to give a mixture of 3,5-dialkyl-4,4'-dinitrodiphenylether and 3,5-dialkyl-2,4'-dinitrodiphenylether. The dinitro compounds can then be catalytically reduced to the diamines which upon phosgenation gives a mixture of 3,5-dialkyl-4,4'-diisocyanatodiphenylether and 3,5-dialkyl-2,4'-dinitrodiphenylether. This process can be represented as follows:

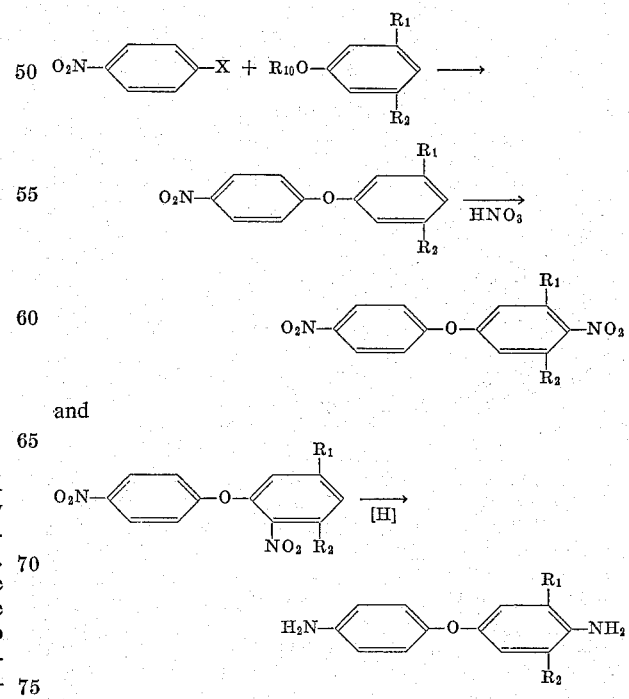

and

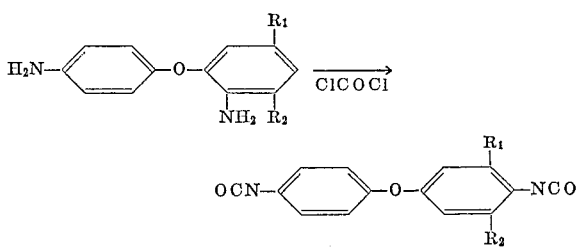

and

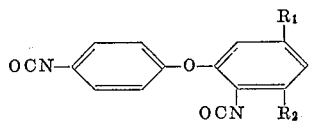

wherein X is a reactive halogen such as bromine, chlorine, or iodine, $R_{10}$ is a reactive alkali metal and $R_1$ and $R_2$ have the assigned meaning.

Alternatively, the 3,5-dialkyl phenol can be nitrated to a mixture of 3,5-dialkyl-4-nitrophenol and 3,5-dialkyl-2-nitrophenol which, as a mixture or separate compounds, can be used in the described process.

General methods can be used for the preparation of other starting materials from which the diisocyanates of this invention can be made. One method is the substitution of p-nitroaniline in both positions ortho to the amino group, and subsequent reduction to the diamine. An example of one type of substitution is halogenation, which is done commercially to make 2,6-dichloro 4-nitroaniline. This nitro aniline can be reduced either chemically or catalytically to 2,6-dichloro-p-phenylene diamine. The p-nitroaniline can also be alkylated to 2,6-dialkyl 4-nitroaniline, which can then be reduced to the diamine.

Another method starts with a 2,6-disubstituted aniline. The aniline is coupled in the p-position with diazonium salt, using the method of Noelting and Thesmar (Ber. 35, 628) and the resulting diazo compound is reduced to the 2,6-disubstituted p-phenylene diamine either chemically or catalytically. Alternatively, the 2,6-disubstituted aniline can be nitrated in the position para to the amino group, and the resulting nitroaniline reduced to the diamine.

The phosgenation of the diamines is carried out in the usual manner, for instance, by treating the dihydrochloride of the diamines, suspended or dissolved in solvents such as toluene, o-dichlorobenzene, or 1,2,4-trichlorobenzene.

The organic diisocyanates of this invention have the very important characteristics of having one —NCO group which reacts normally with compounds containing active hydrogen atoms, i.e., —OH, —COOH, —NH₂, etc., and having one —NCO group which is shielded and less reactive at ordinary temperatures, that is, in the range of 15–40° C. The shielded —NCO group, however, will usually react readily when the temperature is raised to about 50–80° C.

In the case of strongly basic lower aliphatic amines, specifically those with less than 4 carbon atoms, the shielded —NCO group will react at temperatures lower than 50–80° C. These compounds are an exception to the general lack of reactivity shown by compounds containing active hydrogen towards the shielded —NCO group at temperatures below 50–80° C.

These diisocyanates are thus very valuable reactants where it is desirable to preferentially react one end of a bifunctional molecule with one compound and then react the other end with a different compound. Isocyanate groups are particularly valuable in many applications because they react with a number of groups by the formation of urethane or urea type linkages without the formation of by-products. In this particular respect the diisocyanates are considerably superior to the adducts of the prior art where one molecule of a foreign material is generated for each —NCO group freed.

Furthermore, the shielded —NCO group of these new diisocyanates, while inert at room temperature, becomes available for reaction normally at temperatures as low as 50–80° C., compared to 100–150° C. required for the adducts, and 70–75° C. required for tertiary alkyl isocyanates. In addition, the diisocyanates of this invention retain the ability to react with urea linkages to form biuret structures, whereas tertiary alkyl isocyanates do not generally react with ureas, even at quite elevated temperatures.

The isocyanates of this invention possess the same general properties as the aryl-tertiary alkyl diisocyanates. For instance, it is possible to formulate a surface coating using the diisocyanates of this invention under conditions in which the use of a common diisocyanate, such as tolylene 2,4-diisocyanate, would lead to premature gelation. Another important advantage of the isocyanates of this invention over other diisocyanates is that less of the isocyanate can be used in most formulations without leading to gelation. For example, a one-package polyurethane surface coating, cured by reaction with atmospheric moisture, may be made by the addition of diisocyanate to a polymeric triol such as NIAX LG–56. Previously it was often necessary to use 5–10 moles of tolylene diisocyanate per mole of triol to prevent excessive viscosity of the product. Only about 3 moles of the isocyanate of Example 1 are required in order to yield a product of usable viscosity.

The advantage of the diisocyanates of this invention over the aryl-tertiary alkyl diisocyanates is illustrated by their use in the preparation of a cast polyurethane elastomer. A polymeric diol, such as NIAX PPG–2025, is reacted with an excess of diisocyanate. Then, 3-aminopropanol is added and the mixture is then heated at 120° C. for 12 hours. If the diisocyanate of Example 1 is used, a well cured elastomer results. If a typical aryl-tertiary alkyl diisocyanate, such as p-(2-isocyanatoisobutyl) phenylisocyanate, is used, cure is not effected, and the resultant product is a tacky mass.

The unsymmetrical diisocyanates prepared according to the present invention are useful when it is desired to carry out a reaction partially and to reserve one —NCO group for subsequent reaction. In this manner lacquers and adhesives can be prepared at room temperature, the unhindered aromatic —NCO reacting with an active hydrogen of one of the components. The product can then be applied to a surface as a lacquer or as an adhesive. After the solvent has been allowed to evaporate, if one is used, the surface can then be heated to 50–80° C., whereupon the hindered aromatic —NCO group reacts with other active hydrogen groups to cross-link and form insoluble resins.

Another advantage of the present invention is that the hindered aryl—NCO group is affected only slowly by water, thus making the exclusion of moist air less critical than in formulations using common diisocyanates.

The diisocyanates of the present invention are also useful as anchoring substances. The aromatic —NCO group may be reacted with a component such as a water-repellent or a dye, and this reacted product can be applied to a substrate containing active hydrogen atoms, such as cellulosic material, and then heated to 50–80° C. to activate the hindered alkyl —NCO group which gives a chemical bond between the coating and the substrate.

The products of the present invention can also be used in a similar manner for manufacturing molded articles which can be cured by heating to 50–80° C.

It will be apparent that many widely different embodiments of this invention can be made without departing from the spirit and scope thereof.

The following examples are given by way of illustration, but it is to be understood that the invention is not limited to these specific examples.

EXAMPLE 1

*2,6-diethyl-p-phenylenediisocyanate*

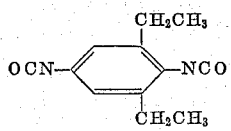

A solution of 0.54 mole of sodium nitrite in 100 mls. of water is added to a cold solution of 0.5 mole of the sodium salt of metanilic acid (m-aminobenzene sulfonic acid) dissolved in 500 mls. of water. The resulting solution is immediately poured into a mixture of 1.25 moles of concentrated hydrochloric acid and 600 grams of ice from which the benzene diazonium salt separates. This step can be represented as follows:

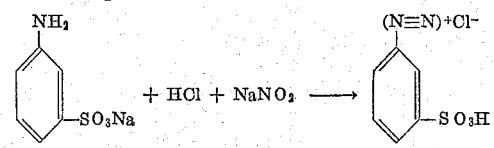

The cold diazonium salt suspension from the previous step is added to a solution of 0.5 mole of 2,6-diethylaniline in 1 liter of 0.5 M hydrochloric acid. The azo dye is recovered by filtration. This step can be represented as follows:

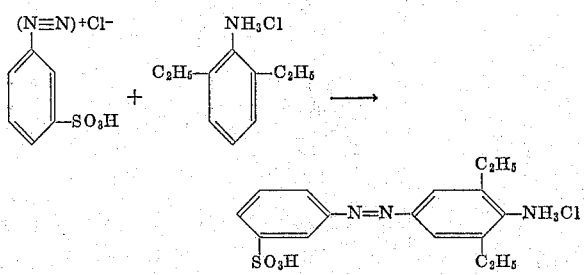

The azo dye is dissolved in 1 liter of sodium hydroxide solution, 1.1 moles of sodium hydrosulfite is added, and the solution heated to 85° C. at which point the oil and water layers separate. The diamine is drawn off and the water layer extracted with a small amount of benzene. The organic extract is distilled under vacuum yielding 2,6-diethyl-p-phenylene diamine which distills at 172–177° C. at 11 mm. This step can be represented as follows:

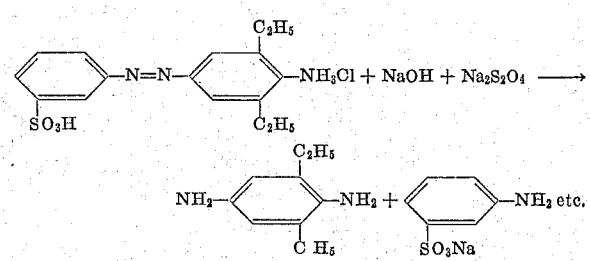

The diamine dihydrochloride is prepared by dissolving 20 g. of 2,6-diethyl-p-phenylene diamine, B.P. 172–177° C. at about 11 mm., in 100 ml. of absolute ethanol, neutralizing with concentrated aqueous hydrochloric acid, and filtering off the precipitated salt.

The diamine dihydrochloride is finely ground, and 10 g. of the ground material is suspended in 500 ml. of 1,2,4-trichlorobenzene. Phosgene is bubbled into the cold, stirred suspension for 40 minutes, and the mixture then heated slowly to 110° C. This cycle is then repeated two additional times. The undissolved salt is filtered off, and the solution vacuum distilled to yield 2,6-diethyl-p-phenylenediisocyanate. The diisocyanate distills at 167–170° C. at about 27 mm., and forms a diethyl urethane melting at 157–158° C.

EXAMPLE 2

*2,6-dimethyl-p-phenylenediisocyanate*

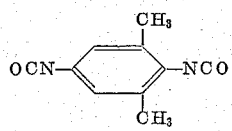

2,6-dimethyl-p-phenylene diamine is prepared by coupling 2,6-dimethyl aniline and the diazonium salt of metanilic acid, and reducing the resultant diazo compound according to the method of Noelting and Thesmar Ber. 35, 628, and as shown in Example 1.

The diamine dihydrochloride is prepared by dissolving 20 g. of the diamine in 100 ml. of aboslute ethanol, neutralizing with concentrated aqueous hydrochloric acid, and filtering off the precipitated salt.

The diamine dihydrochloride is finely ground, and 10 g. of the ground material is suspended in 500 ml. of 1,2,4-trichlorobenzene. Phosgene is bubbled into the cold, stirred suspension for 40 minutes, and the mixture is then heated slowly to 110° C. This cycle of phosgene addition and heating is then repeated two times. The undissolved salt is filtered off, and the solution vacuum distilled to yield 2,6-dimethyl-p-phenylenediisocyanate. The diisocyanate distills at 155–160° C. at about 21 mm., and crystallizes upon cooling.

EXAMPLE 3

*2,6-dichloro-p-phenylenediisocyanate*

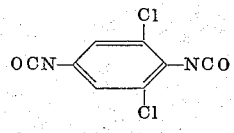

2,6-dichloro-4-nitro-aniline is reduced with zinc and ammonium chloride using the procedure of Morgan and Cleage in J. Chem. Soc. 113, 594 (1918) to form 2,6-dichloro-p-phenylene diamine.

10 grams of the resulting diamine is dissolved in 500 ml. of 1,2,4-trichlorobenzene, and anhydrous hydrogen chloride is passed into the stirred mixture until precipitation of the salt is complete. Phosgene is then passed into the cold, stirred suspension for 40 minutes, and the mixture is then heated slowly to 150° C. The cycle is repeated until the solid has nearly all dissolved. The mixture is filtered, and vacuum distilled to yield 2,6-dichloro-p-phenylene diisocyanate. The diisocyanate distills at 154–158° C. at about 16 mm., and melts at 64–67° C.

EXAMPLE 4

*3,5-diethyl-4,4'-diisocyanato diphenylmethane*

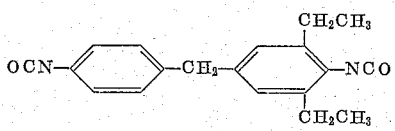

149.4 grams of 2,6-diethylaniline is added to a mixture of 376 ml. of concentrated hydrochloric acid in 2000 ml. of water. After stirring, 140 ml. of formalin (37%) and 280.2 g. of aniline are added. The mixture is allowed to stand for 5½ hours, then heated to 72° C., and allowed to cool overnight. The precipitate is then filtered off. The solution is evaporated to a volume of 1 liter, and cooled overnight. The crystals which precipitate are filtered off under suction, and weigh about 200 g. wet. The wet crystals are then recrystallized from 95% ethanol. The yield of 4,4'-diamino-3,5-diethyldiphenylmethane dihydrochloride is 108.0 g.

10 grams of the diamine dihydrochloride is suspended in 500 ml. of 1,2,4-trichlorobenzene. The stirred suspension is saturated with phosgene at room temperature, and then slowly raised to reflux. The homogenous solution is vacuum distilled to give the product in good yield. The product distills at 190–195° C. at about 1–2 mm., and gradually crystallizes at room temperature.

3,5-dimethyl-4-4'-diisocyanato diphenylmethane is similarly produced using 2,6-dimethylaniline as the reactant.

EXAMPLE 5

*3,5-dimethyl-4,4'-diisocyanato diphenylether and 3,5-dimethyl-2,4'-diisocyanato diphenylether*

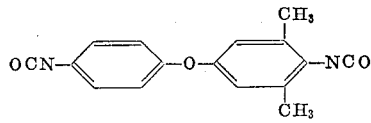

and

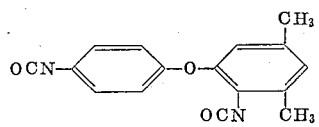

208 grams of 3,5-dimethyl phenol and 80 g. of potassium hydroxide are placed in a 2 liter flask, and the mixture heated to 140° C. until the alkali has dissolved. The stirred mixture is cooled to 110° C. and 0.5 g. of active copper powder catalyst (Org. Syn. II, p. 446) and 79 g. of p-nitrochlorobenzene are added. The mixture is then heated until a spontaneous reaction takes place. After the reaction has subsided another 79 g. of p-nitrochlorobenzene is added, and the mixture again heated until a spontaneous reaction takes place. After the second spontaneous reaction subsides, the mixture is stirred for 30 minutes at 160° C. The melt is poured into 1.5 liters of ice water containing 50 g. of sodium hydroxide, and stirred well. The crude 3,5-dimethyl-4'-nitrodiphenylether separates, is filtered off, and washed with water. The product is then dried and distilled under vacuum.

80 grams of 3,5-dimethyl-4'-nitrodiphenylether is dissolved in 200 g. of acetic anhydride, and the mixture cooled to 0–10° C. A mixture of 31.5 g. of fuming nitric acid (specific gravity 1.51), 20 g. glacial acetic acid, and 20 g. of acetic anhydride are added, with stirring, the temperature being maintained below 10° C. The mixture is allowed to stand at room temperature for 2 hours and then heated at 50° C. for ten minutes. The mixture is poured onto 1000 g. of cracked ice. After the ice melts, 60 g. of sodium chloride is added, the organic layer separated, and the aqueous layer extracted with 250 ml. of ether. The combined organic layer and extract is washed with 50 ml. portions of 10% sodium hydroxide until the water extract remains alkaline, then with 50 ml. water. The extract is freed of ether on a steam bath, and vacuum distilled to yield the product, a mixture of 3,5-dimethyl-4,4'-dinitrodiphenylether and 3,5-dimethyl-2,4'-dinitrodiphenylether.

50 grams of the dinitro mixture is dissolved in 500 ml. of absolute ethanol and reduced with hydrogen at 2000 p.s.i. and 100° C. using 10 g. Raney nickel catalyst. The resulting solution is filtered and then neutralized with concentrated aqueous hydrochloric acid, with the diamine dihydrochloride precipitating. The salt is filtered off, dried, and finely ground.

10 grams of the powdered 3,5-dimethyl-4,4'-diaminodiphenylether dihydrochloride and 3,5-dimethyl-2,4'-diaminodiphenylether dihydrochloride mixture is suspended in 500 ml. of 1,2,4-trichlorobenzene. Phosgene is then bubbled into the cold, stirred mixture for 40 minutes. The suspension is slowly heated to 150° C. The cycle is repeated, if necessary, until the salt is dissolved. The resulting solution is then distilled under vacuum to yield the product, a mixture of the two isomeric diisocyanates.

EXAMPLE 6

*p-Isocyanatobenzyl 3,5-dimethyl-4-isocyanatophenyl ether*

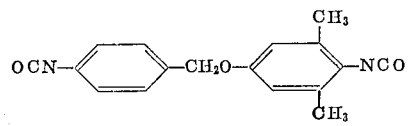

3,5-dimethyl phenol is nitrated as in Example 5 to form 3,5-dimethyl-4-nitrophenol. This compound is converted to the potassium phenolate which is then reacted with p-nitrobenzylchloride to form p-isocyanatobenzyl 3,5-dimethyl-4-nitrophenyl ether which can also be named alpha (4-isocyanatophenyl)-3,5-dimethyl-4 - nitroanisole. The dinitro compound can be reduced as in Example 5 to form p-aminobenzyl 3,5-dimethyl-4-aminophenyl ether which is then phosgenated as in Example 5 to give p-isocyanatobenzyl 3,5-dimethyl-4-isocyanatophenyl ether.

EXAMPLE 7

*1,2,3,5-tetramethyl-4,4'-diisocyanato diphenyl sulfone*

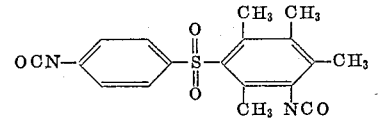

p-Nitrobenzenesulfonylchloride is reacted with isodurene (1,2,3,5-tetramethyl benzene) to form 1,2,3,5-tetramethyl-4'-nitro diphenyl sulfone which upon nitration as in Example 5 gives 1,2,3,5-tetramethyl-4,4'-dinitro diphenyl sulfone. The dinitro compound upon reduction as in Example 5 yields 1,2,3,5-tetramethyl-4,4'-diamino diphenyl sulfone. Phosgenation of the diamine as in Example 5 gives 1,2,3,5-tetramethyl-4,4-diisocyanato diphenyl sulfone.

EXAMPLE 8

*3,5-dimethyl-4-isocyanatophenyl 4'-isocyanatobenzoate*

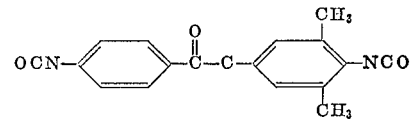

3,5-dimethyl phenol is nitrated by the method of Example 5 to form 3,5-dimethyl-4-nitrophenol which is then esterified by reaction with p-nitrobenzoylchloride to give 3,5-dimethyl - 4 - nitrophenyl 4' - nitrobenzoate. This dinitro compound is reduced as in Example 5 to give 3,5-dimethyl-4-aminophenyl 4'-aminobenzoate which is phosgenated as in Example 5 to give 3,5-dimethyl-4-isocyanatophenyl 4'-isocyanatobenzoate.

EXAMPLE 9

*4,3'-diisocyanato 2', 4', 5',6'-tetramethyl benzophenone* p-Nitrobenzoylchloride is reacted with isodurene in the presence of aluminum chloride to form 4-nitro 2',3',4',6'-tetramethylbenzophenone, which upon nitration by the procedure of Example 5 gives 4,3'-dinitro 2',4',5',6'-tetramethyl benzophenone. Reduction of the dinitro compound as in Example 5 gives 4,3'-diamino 2',4',5',6'-tetramethyl benzophenone which is phosgenated as in the same example to give 4,3'-diisocyanato 2',4',5',6'-tetramethyl benzophenone.

EXAMPLE 10

2-(4-isocyanatophenyl)-2-(3,5-diethyl-4-isocyanato)-propane

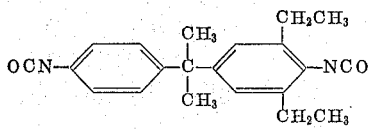

Aniline and 2,6-diethylaniline are coupled with acetone in the presence of hydrochloric acid to form 2-(4-aminophenyl)-2-(3,5-diethyl - 4 - amino)-propane which, upon phosgenation by the procedure of Example 5, gives 2-(4-isocyanatophenyl)-2-(3,5-diethyl - 4 - isocyanato)-propane.

EXAMPLE 11

3,5-diethyl-4,4'-diisocyanatobiphenyl

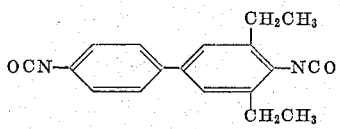

4,4'-dinitrobiphenyl is partially reduced to 4-amino-4'-nitrobiphenyl which is ethylated to form 4-amino-3,5-diethyl-4'-nitrobiphenyl which is then reduced to give 3,5-diethyl-4,4'-diaminobiphenyl. The diamine is then phosgenated to give 3,5-diethyl-4,4'-diisocyanatobiphenyl.

EXAMPLE 12

1,4-diisocyanato-2-ethyl-6-methoxy benzene

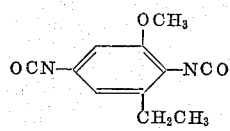

2-methoxy-4-nitroaniline is ethylated to give 2-ethyl-6-methoxy-4-nitroaniline which is reduced as in Example 5 to give 1,4-diamino-2-ethyl-6-methoxy benzene. Phosgenation of the diamine gives 1,4-diisocyanato-2-ethyl-6-methoxy benzene.

EXAMPLE 13

2-chloro-6-trifluoromethyl-p-phenylenediisocyanate

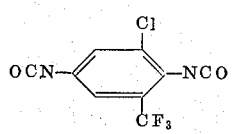

o-Trifluoromethyl acetanilide is nitrated to 4-nitro-2-trifluoromethyl acetanilide which is hydrolyzed to 4-nitro-2-trifluoromethylaniline and then chlorinated to 2-chloro-4-nitro-6-trifluoromethylaniline. This compound is then reduced to 2-chloro-4-amino-6-trifluoromethylaniline and the diamine then phosgenated to give 2-chloro-6-trifluoromethyl-p-phenylenediisocyanate.

EXAMPLE 14

3,5-dimethyl-4,4'-diisocyanatodiphenyl sulfide

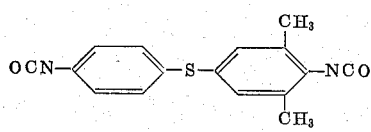

p-Nitrochlorobenzene is reacted with the potassium salt of 3,5-dimethylthiophenol to form 3,5-dimethyl-4'-nitrodiphenyl sulfide which is nitrated according to Example 5 to form 3,5-dimethyl-4,4'-dinitrodiphenyl sulfide. This dinitro compound is then reduced by the method of Example 5 to give 3,5-dimethyl-4,4'-diaminodiphenyl sulfide. The diamine is then phosgenated as in Example 5 to give 3,5-dimethyl-4,4'-diisocyanatodiphenyl sulfide.

The following examples illustrate the use of some of the novel compounds of this invention in the production of polymeric materials:

EXAMPLE 15

Cast polyurethane elastomer 0.01 mole of dry "Teracol" polyalkyleneether-glycol (mole wt. 3000)) is melted, and the temperature is then reduced to 40° C. 0.02 mole of 2,6-diethyl-p-phenylene diisocyanate is then added and mixed in, and the mixture allowed to stand for 6 hours. Then 1 ml. of a saturated solution of triethylene diamine in dioxane is added and stirred in. Then 0.0071 mole of 3-amino-1-propanol is rapidly added and thoroughly mixed in. The pasty mixture is transferred to a mold and cured at 135° C. for 12 hours. The product is a tough elastomer which undergoes a small amount of "post-cure" upon exposure to the atmosphere for several weeks.

EXAMPLE 16

Cast polyurethane elastomer 0.01 mole of dry "Teracol" polyalkyleneether-glycol (mole wt. 3000) is melted, and the temperature is then reduced to 40° C. 0.02 mole of 3,5-diethyl-4,4'-diisocyanatodiphenylmethane is then added and stirred in, and the mixture is allowed to stand for 6 hours. Then 0.008 mole of 3-amino-1-propanol is rapidly added and thoroughly mixed in. The pasty mixture is transferred to a mold and cured at 130° C. for 24 hours. The product is a soft, tough, elastomer which becomes perceptibly stiffer upon exposure to the atmosphere for several weeks.

EXAMPLE 17

One-package polyurethane coating 0.1 mole of polymeric triol 11–80 (Dow Chemical Company, mol. wt. 700) is mixed with 0.25 mole of 2,6-diethyl-p-phenylenediisocyanate. Then 50 ml. of methylisobutyl ketone is added. The resulting mixture is stable for several weeks in the absence of moisture. When this mixture is coated onto a glass or metal plate, and then exposed to the atmosphere for several days, it cures to a hard, tough coating.

EXAMPLE 18

One-package polyurethane coating 0.1 mole of polymeric triol 11–80 (Dow Chemical Company, mol. wt. 700) and 0.01 mole of polymeric diol P–1200 (Dow Chemical Company, mol. wt. 1200) are mixed with 0.30 mole of a mixture of 3,5-dimethyl-4,4'-diisocyanatodiphenylether and 3,5-dimethyl-2,4'-diisocyanatodiphenylether. Then 70 ml. of methylisobutyl ketone is added. The resulting mixture is quite stable in the absence of moisture. When this mixture is coated onto a glass, metal, or wood panel, and exposed to the atmosphere for several days, it cures to a tough, hard coating.

EXAMPLE 19

Five grams of a polymeric adduct of sorbitol and proplyene oxide having a hydroxyl number of 280 and 7.65 grams of 3,5-diethyl-4,4'-diisocyanatodiphenylmethane are placed into a dry 25 ml. Pyrex flask having a ground-glass stopper. The stopper is taped with vinyl plastic tape, and the contents stirred by shaking and rolling. The diisocyanate goes into solution somewhat slowly at room temperature, and the solution viscosity does not increase to a very high value even after standing for one month at room temperature. Reaction of a sample with excess dibutylamine, followed by back titration with alcoholic hydrochloric acid shows that about 50% of the isocyanate groups has reacted.

EXAMPLE 20

Five grams of the polymeric hexol used in Example 19 and 4.35 grams of 2,4-tolylene diisocyanate are placed into a dry Pyrex ground-glass stoppered 25 ml. flask. The stopper is taped with vinyl plastic tape and the reaction mixture is stirred by shaking and rolling. The mixture begins to increase in viscosity soon after it becomes homogeneous, and gels within a few hours.

EXAMPLE 21

The experiment described in Example 20 is repeated using 6.25 grams of 4,4'-diisocyanatodiphenylmethane (MDI) in place of the 2,4-tolylene diisocyanate. The reaction mixture gels within a few hours.

Various changes and modifications of the invention can be made and, to the extent that such variations incorporate the spirit of this invention, they are intended to be included within the scope of the appended claim.

What is claimed is:

An aromatic diisocyanate having the structure

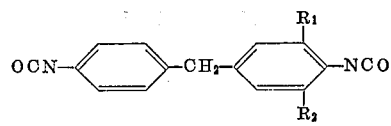

wherein $R_1$ and $R_2$ are lower alkyl groups, and wherein the two isocyanato groups differ in their reactivity with alcoholic hydroxyl groups, said difference in reactivity resulting in a ratio of the reaction rates at 10 to 20% reaction and at 70 to 90% reaction of from about 20 up to about 100 when said diisocyanate is reacted at about 25° C. with a ten-fold excess of 2-ethyl hexanol.

References Cited by the Examiner

UNITED STATES PATENTS

| | | | |
|---|---|---|---|
| 2,511,544 | 6/50 | Rinke et al. | 260—77.5 |
| 2,683,730 | 7/54 | Seeger et al. | 260—578 |
| 2,729,666 | 1/56 | Stallman | 260—77.5 |
| 2,757,184 | 7/56 | Pelley. | |
| 2,858,296 | 10/58 | Stilmar | 260—453 |
| 2,908,704 | 10/59 | Skiles | 260—453 |
| 3,115,479 | 12/63 | Windemuth et al. | 260—77.5 X |

FOREIGN PATENTS 779,806   7/57   Great Britain.

CHARLES B. PARKER, *Primary Examiner.*

LEON ZITVER, *Examiner.*